P. G. PEARSON, OF JACKSONVILLE, FLORIDA.

Letters Patent No. 89,430, dated April 27, 1869; antedated April 20, 1869.

IMPROVED BEVERAGE FROM SOUR OR BITTER ORANGES.

The Schedule referred to in these Letters Patent and making part of the same.

*To all whom it may concern:*

Be it known that I, P. G. PEARSON, of Jacksonville, in the county of Duval, and State of Florida, have invented a new and useful Improvement in Orange-Wine; and I do hereby declare that the following is a full, clear, and exact description thereof, which will enable others skilled in the art to make and use the same.

This invention relates to the production of a vinous compound, or wine, the same being produced from sour or bitter oranges, so called, a fruit growing abundantly on the coast of Florida, and the immediately adjacent regions.

The indigenous oranges of the southern coasts possess a bitter taste, which renders them undesirable as an edible fruit, and consequently the large annual crops of this abundant fruit were not, until my invention, utilized in any considerable degree, their use being chiefly limited to consumption in the form of preserves, and other like uses.

By my invention, however, a good quality of wine is produced, which will keep and improve with age, as with grape-wine.

The process of manufacture is as follows:

The oranges are peeled, and the juice pressed out, in any suitable press, immediately after being peeled.

I next provide a mixture of sugar and water, in the proportion of two pounds of sugar to one gallon of water.

This mixture is made to simmer gently over a slow fire, and is skimmed until all sedimentary matter has been removed, which will be ascertained by the same ceasing to rise, and the clear appearance of the mixture.

It is then permitted to cool, when the crude orange-juice is added, in proportions of one pint of juice to one gallon of the mixture.

The whole is then put in casks, or barrels, which are left with the bung open, and left to vinous fermentation.

The barrels should be filled completely.

The rapidity of fermentation will vary with the temperature, and a cool place should be selected, to avoid the liability of acetic fermentation.

As a quantity of the wine will evaporate, some of the saccharine mixture before described must be kept on hand, to supply the loss from evaporation, which will be about a pint in twenty-four hours for every barrel.

The barrels must be thus kept filled during the process of fermentation, during which the impurities and foreign matter will pass off at the bung.

When fermentation ceases, the barrels are bunged tightly, and left in a cool place for about six months, when the wine may be racked off in other barrels, and suffered to stand for a month. It is then ready for bottling.

Care must be exercised in the selection of barrels, as new oak barrels, or those previously used to contain anything but wine, are unsafe to use, as the wine will either have the flavor of the previous contents, or of the wood, or be liable to acetic fermentation.

Having thus described my invention,

What I claim as new, and desire to secure by Letters Patent, is—

As a new article of manufacture, the orange-wine, made from sour or bitter oranges, in the manner and by the process herein shown and described.

The above specification of my invention signed by me, this    day of    , 1868.

P. G. PEARSON.

Witnesses:
O. BROWN,
L. M. BUFFINGTON.